United States Patent [19]

Veitch

[11] Patent Number: 4,739,400
[45] Date of Patent: Apr. 19, 1988

[54] VISION SYSTEM

[76] Inventor: Simon J. Veitch, Ilderton, Mathoura, NSW 2710, Australia

[21] Appl. No.: 56,934

[22] Filed: Jun. 3, 1987

Related U.S. Application Data

[62] Division of Ser. No. 800,643, Nov. 6, 1985, Pat. No. 4,688,090.

[30] Foreign Application Priority Data

Mar. 6, 1984 [AU] Australia .................. PG3924

[51] Int. Cl.⁴ .................................. H04N 7/18
[52] U.S. Cl. .................................. 358/108; 84/1.01; 84/1.18; 358/105; 358/903
[58] Field of Search ............... 358/108, 105, 93, 903, 358/88, 91, 92, 3; 84/1.01, 1.18, DIG. 19, DIG. 23

[56] References Cited

U.S. PATENT DOCUMENTS

| 2,473,893 | 6/1949 | Lyle | 358/107 |
| 2,604,607 | 7/1952 | Howell | 358/88 |
| 3,674,921 | 7/1972 | Goldsmith | 358/91 |
| 3,697,675 | 10/1972 | Beard | 358/3 |
| 3,811,010 | 5/1974 | Long | 358/105 |
| 4,081,830 | 3/1978 | Mick | 358/105 |
| 4,504,933 | 3/1985 | Janney | 84/1.01 |
| 4,688,090 | 8/1987 | Veitch | 358/108 |

Primary Examiner—Howard W. Britton
Attorney, Agent, or Firm—Pollock, Vande Sande & Priddy

[57] ABSTRACT

Apparatus is disclosed for viewing a target volume by two spaced apart viewing devices which create respective two dimensional video picture frame signals. The picture frame signals are divided into discrete areas. If there is an image change in one of the discrete areas then analyzing means provides control signals which feed a reaction providing means, which in turn is then responsive to a change of an object within the volume.

9 Claims, 6 Drawing Sheets

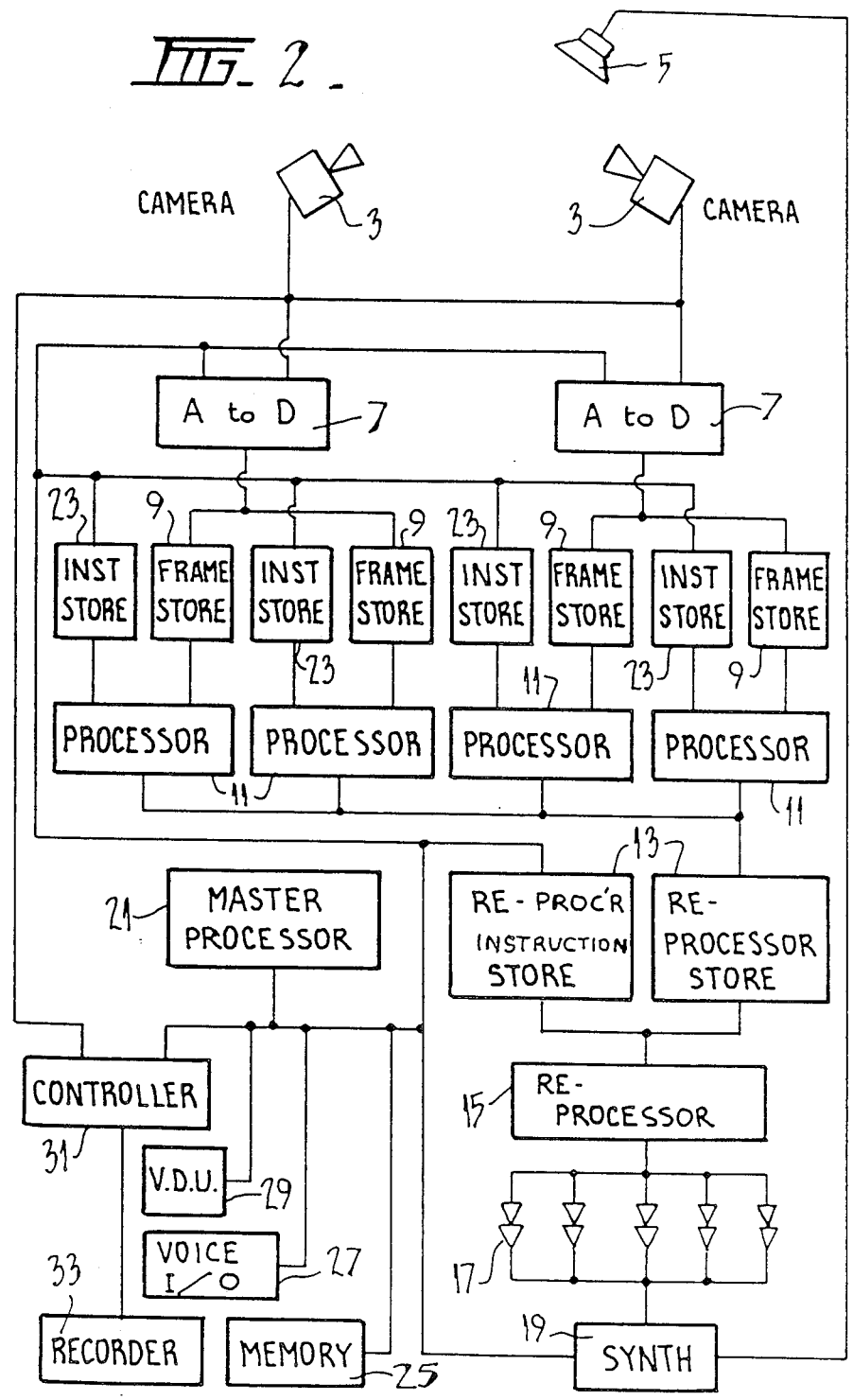

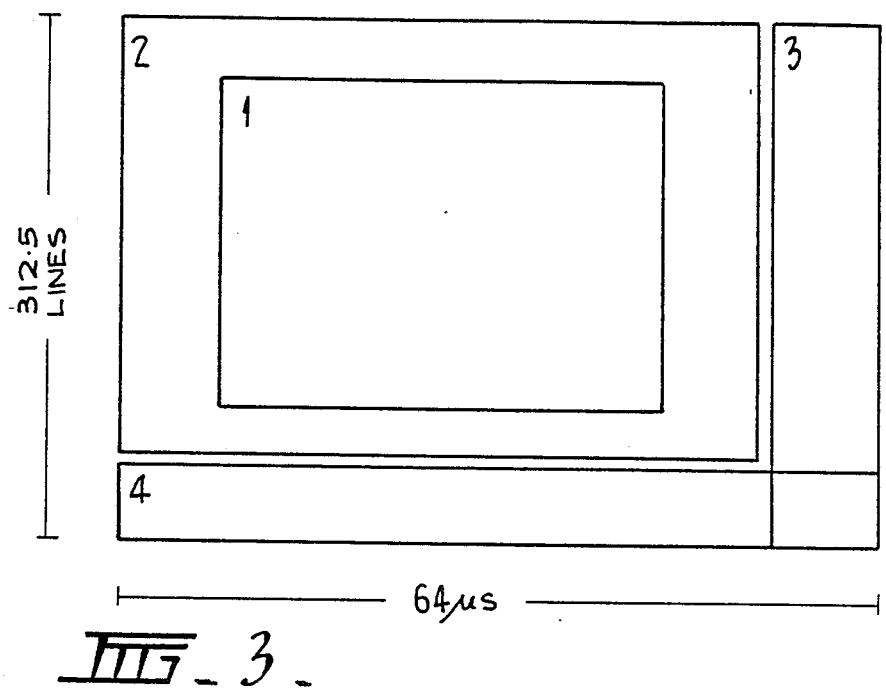
FIG_3.
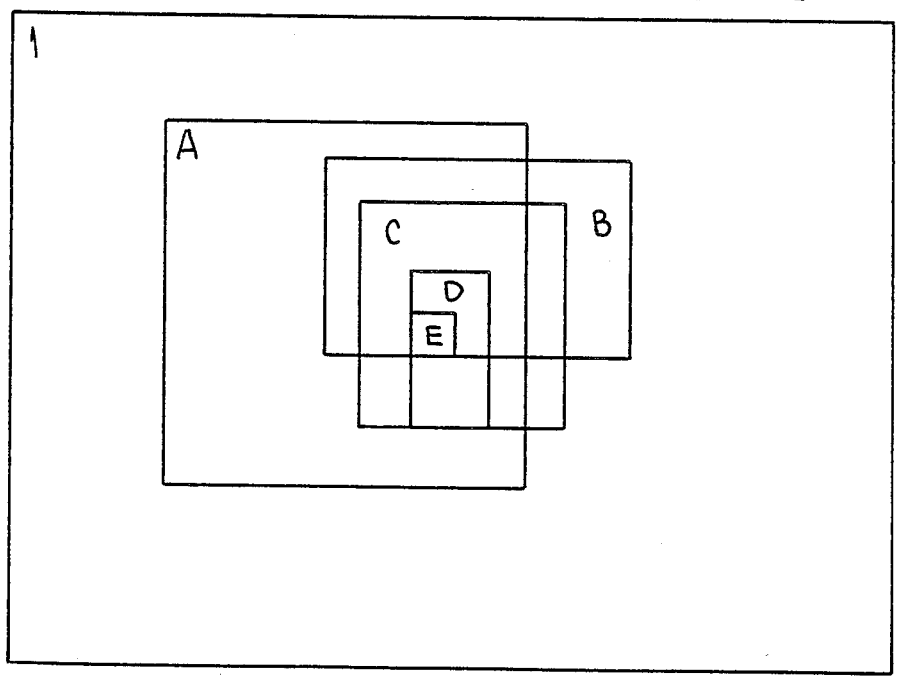
FIG_4.

VISION SYSTEM

CROSS REFERENCE TO RELATED APPLICATION

This is a division of U.S. Pat. application Ser. No. 800,643, filed Nov. 6, 1985, now U.S. Pat. No. 4,688,090.

FIELD OF THE INVENTION

This invention relates to a vision system and relates particularly but not exclusively to an electronic vision system which will provide a reaction in a target area consequent on a changing image in the target area.

The invention has particular application in the field of robotics but it has application in many other fields.

In one form the invention has particular application in the art of playing synthesizers. In this application a person is viewed by a video system and movements of the person are translated as variables to control the output signal from a synthesizer. In this way a synthesizer can be played by a person moving within a target area. Sequences of tones and colours can be provided to the synthesizer output by movement of body limbs. Movement of a person's body as a whole could provide gross changes to the synthesizer output whereas movement of individual limbs such as arms and/or fingers could provide tonal character to the synthesizer output.

DESCRIPTION OF PRIOR ART

In the art relating to playing of musical instruments, such as synthesizers, it has not been possible to provide control of the musical content by the mere presence and/or absence of an image. Typically the synthesizer is played by an operator who depresses keys to generate specific tones and/or to activate memory circuits to replay selected prerecorded material. A synthesizer is technically able to produce any sound required and the user interface which comprises the known keyboard and switches has limited the control of sound which can be generated at any one time. In other words the synthesizer has been seriously limited by the quality of the interface between the user. With the application of the present invention to a synthesizer a desired reaction i.e. reproduction of music from the synthesizer, can be provided by the mere movement of a person within a target area. This, in turn, will permit a higher quality interface and hence more complete control over musical synthesis.

STATEMENT OF INVENTION

Therefore according to a broad aspect of the present invention there is provided apparatus for viewing a target volume and for providing a reaction consequent on a changing image therein comprising, (a) two means for viewing the target volume at spaced apart locations and for creating respective two dimensional video picture frame signals of the target volume which collectively define said target volume, (b) analyzing means for analyzing the signals relating to at least one discrete area within each respective picture frame, said analyzing means having feeding means for feeding control signals generated therein to a reaction providing means, said control signals being generated during a respective single frame of each respective picture frame, to provide said reaction consequent on there being an image change in the at least one discrete area from an earlier frame.

Preferably the analysing means is dynamically alterable so as to view different discrete areas.

Most preferably the apparatus is a musical synthesizer, the output of which is controlled by viewing a change of an object within the volume.

BRIEF DESCRIPTION OF DRAWINGS

In order that the invention can be more clearly ascertained preferred constructions will now be described with reference to the accompanying drawings wherein:

FIG. 2 is a view similar to that of FIG. 1 but showing apparatus for providing output from the synthesizer based on a three dimensional analysis of a target area;

FIG. 3 is a schematic diagram of a television picture frame image.

FIG. 4 is a graphical representation of areas which may be viewed during a picture frame.

DETAILED DESCRIPTION OF PREFERRED EMBODIMENTS

Figure 1:
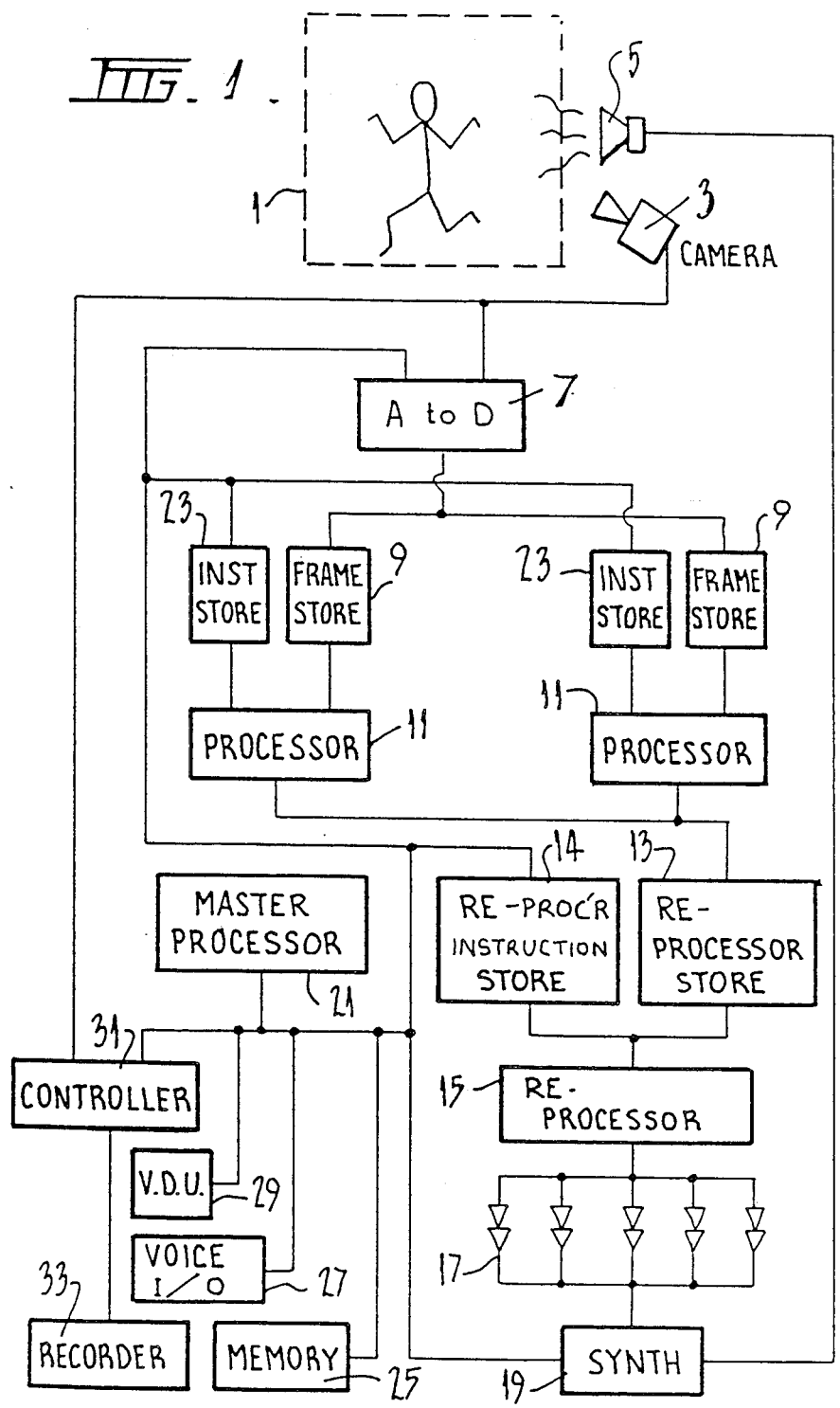
FIG. 1 is a simplified block schematic diagram of preferred apparatus connected with a synthesizer to provide a reaction in the target area i.e. sound from the synthesizer, which is determined by an image change within the target area.

Referring now to FIG. 1 there is shown a target area 1 in which a person such as a player of the apparatus is to move. A video camera 3 is positioned to observe the target area 1. A reaction providing means in the form of a loud speaker 5 is provided so as to direct sound into the target area 1. The output from the camera 3 is fed to an analog to digital convertor 7. The output of the analog to digital convertor 7 is, in turn, passed by direct memory access to frame stores 9. The outputs from the frame stores 9 are, in turn, fed to processors 11 and the outputs of the processors 11 are, in turn, fed through a reprocessor store 13 and reprocessor 15 and through an interface 17 to a synthesizer 19. Signals which are generated by the camera 3 are, in turn, processed through the apparatus to operate the synthesizer 19 to provide audible signals into the target area 1 via the loud speaker 5.

The synthesizer 19 is controlled by the signals representative of the target image occurring therein.

Control of the processing stages is provided by a master processor 21. This master processor 21, in turn, provides instruction codes to instruction stores 23 and 14 which, in turn, control the processors 11 and the reprocessor 15. The master processor 21, in turn, initializes the system to allow orderly control of recording of picture signal images in the frame stores 9, acceptance of voice command controls from the voice input 27 placed at a convenient location near the target area 1, and control of images from controller 31 to a video display unit 29.

The controller 31 presents video images to the video display unit 29 which may be superimposed with graphics representing particular configurations of the system as a whole. The controller also provides video picture signals back to the input of the analog digital convertor 7. The controller output, in turn, can be fed to a recorder unit to record frame by frame picture images. The recorder can typically comprise a video recorder 33.

Referring now to FIG. 2 there is shown a three dimensional system which is otherwise identical to that shown in FIG. 1. The difference being that in FIG. 2 there are two video cameras 3 and a parallel set of frame stores 9 and instruction stores 23 and processors 11. Additional parallel sets of cameras 3, frame stores 9, instruction stores 23 and processors 11 can be added to provide enhanced views and sound synthesizing.

In the embodiment shown in FIGS. 1 and 2 the cameras 3 are standard 625 line cameras. If desired these cameras could be replaced by C.C.D. devices or by a signal source such as from a video recorder/play back unit. The analog to digital convertors 7 receive picture image signals from the cameras 3 and/or from the controller 31. The matrix for storage of a image in the target area 1 is typically 256×256×8 bits and occupies a rectangular section of the video frame. The instruction stores 23 are typically dual port memory devices which hold specific task codes generated by the master processor 21 for subsequent execution by the processors 11. The frame stores 9 are typically dual port high speed memory devices. These are refreshed at a frame speed (20mS) by the analog-to-digital convertors by direct memory access 7. Each frame store 9 typically holds a complete digital representation of a single video frame at any one instant. Typically the frame is held for one frame period and then up-dated each subsequent frame period. However, if desired a frame or discrete area of a frame may be held for many frame periods so as to permit detailed examination. The processors 11 are typically slave processors which process video data which is held in the frame stores. Processing by the processors 11 is typically on select and/or discrete areas within the target area 1. The reprocessor store 13 is typically a frame store dual port memory device which holds values related to specific target areas within the device. It also retains other data which is generated by the processors 11. The reprocessor 15 uses instructions held in the reprocessor instruction store 14 to manipulate, bias, weight and combine data held in the reprocessor store 13. The interface 17 provides communication between the video processing circuitry and the synthesizer.

The synthesizer 19 is a multi voiced digital synthesizer and controlled with signals generated within the apparatus. The master processor 21 is typically a processor which controls the system and despatches tasks to the various processors 11, and 15. The memory 25 is typically the main memory of the system and provides for off line storage of information. This can be a disk storage means controlled by the master processor 21. The recorder 23 is used for storing frames selected by the apparatus.

It should be appreciated that the apparatus is set into a mode whereby video images are converted to digital signals and areas defined by predetermined patching of the apparatus area considered and analysed for any change. This, in turn, would represent that there is a change in the target area requiring a modification of the synthesizer output. The areas which are considered will hereinafter be referred to by the term gangs.

A gang is an area under consideration during each frame period. The pixels comprising that area may be averaged whereby to obtain values for each gang for each frame. Many such gangs may be provided in the target area during each frame period or alternatively there may be only one gang in the target area. The gangs may be spaced from each other or be overlaid. This will be discussed later.

FIG. 3 shows a typical frame image and a dissection of that image. The area defined by rectangle 1 represents the actual visible target area as seen by the camera 3. The matrix 1 does not fill the entire frame. The remaining area serves two purposes. These will be described in due course. The area represented by numeral 2 represents a border around the matrix 1. The area represented by numeral 3 is representative of the raster return whilst area 4 represents a frame gap. The purposes of the border 2 are:

1. That it reduces a proportion of a frame period consumed by data acquisition periods and allows more time for further processing of individual discrete areas in the target area.

2. A border enables a method to be implemented for providing system control by permitting the merging of data and control streams in each frame, allowing a frame to be read, so as to extract such information which is within the border 2 and subsequent reading of the matrix 1 as data.

In other words the digital signals need to be identified as picture image signals or instruction signals. By this technique necessary image and image processing instructions can be conveyed in one frame period.

If desired, however, the image and data signals can be separated into frame periods and the invention is to be construed as including this.

In this way sound created within the system can be stored in the form of a video frame containing individual specifications per frame. Referring now to FIG. 4 there is shown a typical arrangement of gangs. This arrangement is by no means representative of the only possible combination of gangs as a gang may comprise a discrete area such as one pixel in one corner of the matrix 1. In FIG. 4 the gang E is enclosed within the boundaries of all the other overlaying gangs. Any image change occurring within gang E will be representative of a change occurring in each one of the remaining overlaying gangs. The change in the gangs will vary by an amount proportional to the ratio of their respective sizes. For example:

| Gang | Pixels | Ratio |
|---|---|---|
| A | 3600 | 1:72 |
| B | 1664 | 1:33.3 |
| C | 1225 | 1:24.5 |
| D | 300 | 1:6 |
| E | 50 | 1:1 |

Accordingly an image change in gang E will affect each of the other gangs by an amount proportional to their respective sizes in the ratios given. Each gang is used for inspecting a selected area within the matrix 1 i.e. a specific area of the image viewed by the camera 3. If there is any image change within the area of the gang being viewed then there may be a consequent programmed change in the apparatus to, in turn, cause that gang or other to change in shape or location so as to provide a further examination of the image change.

Typically the gangs are large in number and the system may be programmed to converge some of the gangs towards an object which is moving within a particular gang. Gangs may also change state, reducing in area, each frame period as they converge towards any image change under investigation so as to examine smaller and smaller areas for a change i.e. to observe the movement of a persons finger or winking of an eye.

The gangs may be subjected to several types of operation within the apparatus. These are identified as types of operation A, B, C, D respectively.

TYPE A

In this configuration the gangs are predetermined in area and the instruction to the master processor 21 is such that the gangs will not dynamically change during operation. In this configuration the synthesizer output will vary as a direct consequence of there being a change in the image within the gangs.

TYPE B

In this type the gangs are initially predetermined as to their area and positions in the target area on a picture frame and when a predetermined change occurs (i.e. a change above a predetermined threshold level) in one or more of the gangs then the gangs are dynamically altered in accordance with a preprogrammed instruction delivered by the master programmer 21. The instructions may be stored in memory 25.

TYPE C

In this type there is an initial gang configuration of a predetermined nature applied over the target area of the frame image and when there is a change in the image occurring within one or more of the gangs (above a predetermined threshold level) and wherein such change is not recognizable or matched to preprogrammed conditions in the master processor 21, then the apparatus is put into a search mode whereby the memory 25 is consulted to see if a similar gang change has occurred during past events. If no direct comparison is found in the memory then procedures for the next closest comparable change are chosen and the procedures which were adopted for subsequent gang configurations for that procedure are then applied to the system to dynamically change the gang size and layout for subsequent frames in accordance with that recorded past event.

TYPE D

In this type of operation, if there is a change in the gangs (above a predetermined threshold level) and this change occurs for only several frame periods, the apparatus will naturally be placed into type C above. However, before a desired gang pattern or configuration is reapplied and followed to its conclusion, the change which has occurred in the target area may terminate. This may be representative of a bird or like fast moving object passing through the target area. In this type of operation the apparatus will be programmed to abort any searching for similar past events and will resume normal operation.

Therefore the gangs have two primary functions:
(a) To look at an area within the target area and cause a reaction to occur from the reaction providing means based on preprogrammed instructions.
(b) To cause a change in the pattern of the gangs for subsequent frame periods and to also simultaneously cause a change to occur in the reaction providing means.

Both functions a and b can occur simultaneously during one or more frame periods.

Thus, the apparatus may be programmed to provide large synthesizer changes if there is initial change in some of the gangs and small tone or colour changes or the like if there is a subsequent change. Alternatively the apparatus may be programmed to provide large synthesizer changes consequent on there being a predetermined change in various gangs and small tone or colour changes may be provided on there being a predetermined change in other gangs. Every frame period may result in a change in the gang configuration consequent on there being a movement within each gang in the preceding frame. Each gang may be assessed for a zero bias at any one time. This is typically provided whereby to eliminate static conditions within the field of view of the camera 3.

A quiescent gang value is determined and is then used as zero levels so that any change above or below that level will be representative of a change occurring in the gang.

The reprocessor 15 has several functions. It passes the gang values directly to the synthesizer; it weights the gang values with offset and arithmetic manipulations to place the signals in a desired range; it modifies the gang value with more complex functions as preprogrammed to give desired total qualities thereto. This can be in the form of exponential functions if desired; it combines two or more gang values from the same or separate video sources to create further levels of gang configurations; it can enable observation of selected gang values for concurrence with predetermined values. This is provided to enable reconfiguration of gangs into prescribed formats during use of the apparatus.

The apparatus operates to provide synthesizer output by observing changes in a group of gangs which are collectively known as an interrogation gang. Typically all the gangs A, B, C, D, E as shown in FIG. 4 form an interrogation gang. The apparatus is programmed to look at the collective gang values of the interrogation gang over a period of time to form the basis of an event signal which will alter the state of the apparatus.

The interrogation sequence is as follows. An event occurs within the field of view of the cameras 3. A tonal change is then detected by the apparatus. An interrogation gang is then imposed on the area where a change is occurring in the field of view of the cameras 3. The change in the gang values and subsequent processing then results in an event signal which is a quantification of the change used to index data and this will then alter the apparatus to provide a change in the overlaying of gangs for subsequent frame(s) and appropriate reprocessing of subsequent data signals. Further information gathering occurs as the interrogation gangs are formed into different arrangements. This in turn, is programmed so as to narrow the range of subsequent system responses until a specific change occurs in the interrogation gang. This processing is limited by time in order to provide orderly control.

The response of the system may take several forms. For example there may be a passive response in which a change is referenced but no action is taken. An active response may occur which upgrades an event record where a defined and programmed change will then occur. An active response may also occur which involves the initiation of further information gathering activities concerning the area under view of the camera 3. This in turn will result in predetermined signals being generated within the synthesizer 19. An active response may also be generated that initiates a control sequence which is passed to cause items external of the system to operate. These may comprise operation of stage lighting, automatic machinery or the like.

The apparatus has four modes of operation. These can be identified as:
1. Action.
2. Patch.
3. Patch Synthesizer.
4. Maintenance.

In the action mode the apparatus accepts data from the field of view, generates control signals and feeds them to the synthesizer 19. The synthesizer 19 then, in turn, provides output signals which are fed to the reaction providing means such as the loud speaker 5. In the patch mode the actual configuration of the various gangs is programmed into the main memory 21. This enables various mathematical variations to be placed on the gang value signals and the manner in which the gang values will converge to any given area. In the patch mode two forms of operator interfaces may be provided. One of these may be by means of a VDU screen which is referenced with a light pen, cursor or typed instruction and the other is the VI/O input 27. Here spoken commands can be analysed and predetermined instructions corresponding to those commands entered into the memory and predetermined system responses initiated. In the patch synthe mode the apparatus accepts data from the VDU 29 or from the video frame store 33 to permit screen graphics to be implemented for controlling the required patch while simultaneously permitting the patching status to be displayed. In the second mode stored video information can be automatically fed to reconfigure the patch. In the maintenance mode this permits automatic system supervision and the formatting and filing of patch and status information. As manual patching could take considerable operator skill and time the details describing any patch can be recorded in two ways:
1. As a named file.
2. As a named file translated into video signals and stored in the border 2 of the frame image shown in FIG. 3.

The synthesizer is suitably patched through the interface 17 such that the various synthesize mechanisms can be orderly controlled. The patching is performed by an operator before using the apparatus and this can be controlled in any desired way by means of the VDU 29.

The apparatus is programmed in accordance with programme instructions by Motorola as listed in their brochure Microsystems, Issue A, Motorola Inc. 1980 for M68KORMS68K—Real—Time Multitasking Software. Individual tasks are then assigned by the user.

The apparatus without the synthesizer connected thereto is a device which gathers information from the video image within the field of view of the camera(s) 3. Individual gangs are then tailored to produce specific gang values resulting from a specific change occurring in the field of view. Any change subsequently results in a signal being generated to provide appropriate reaction to a reaction providing means. Accordingly with appropriate control of the apparatus it will have particular benefit in the field of behavioral psychology. For example, a behavioral theory could be framed in terms of an apparatus patch programmed for a specific event(s). Accordingly reaction such as tabulation of information, operation of photographic memory means or the like can be implemented.

Figure 5:
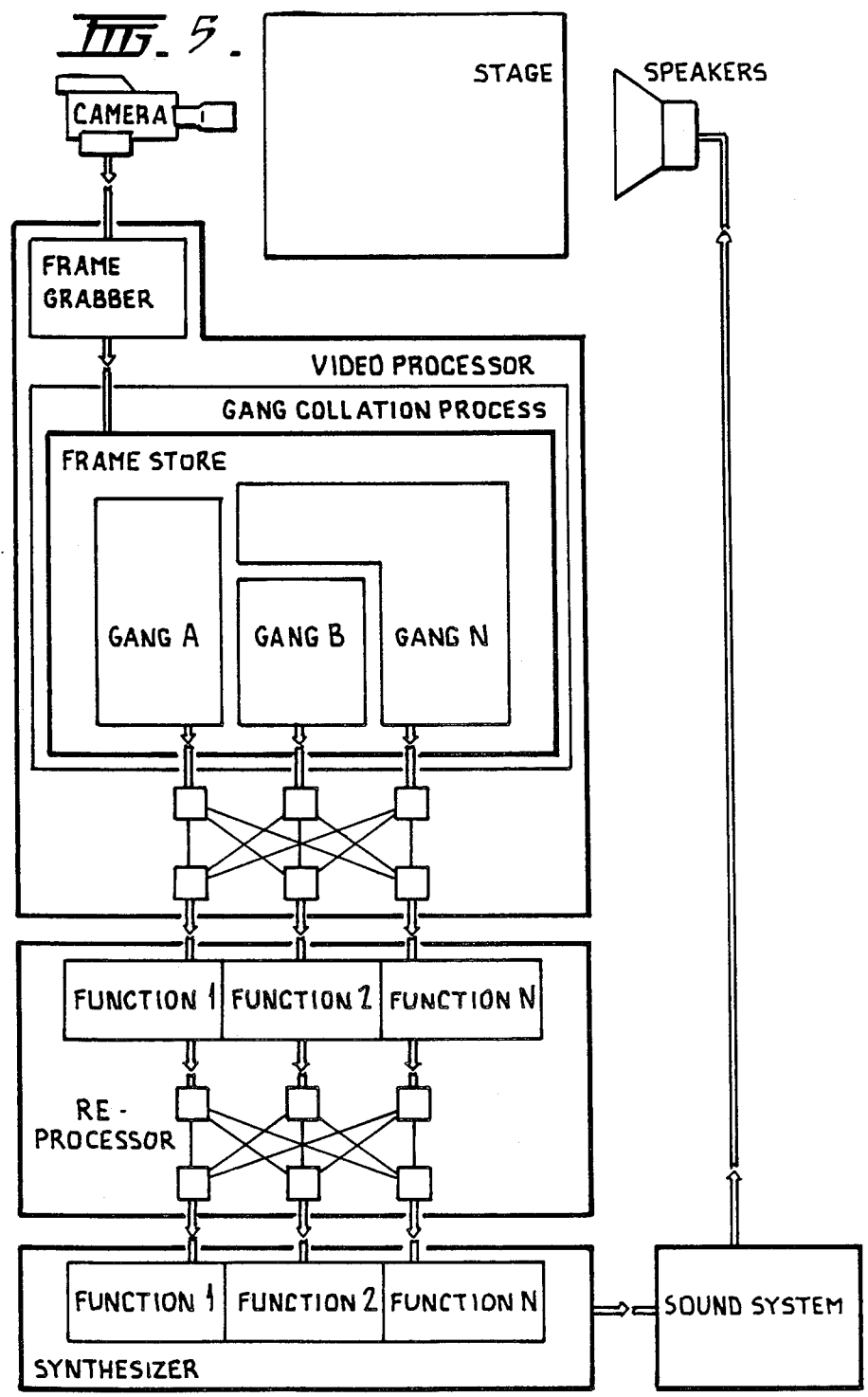
FIG. 5 is a simplified block circuit diagram of the embodiment shown in FIG. 1.

Referring now to FIG. 5 there is shown a block circuit diagram which is a simplified version of the block circuit diagram shown in FIG. 1. FIG. 5 is self explanatory.

Figure 6:
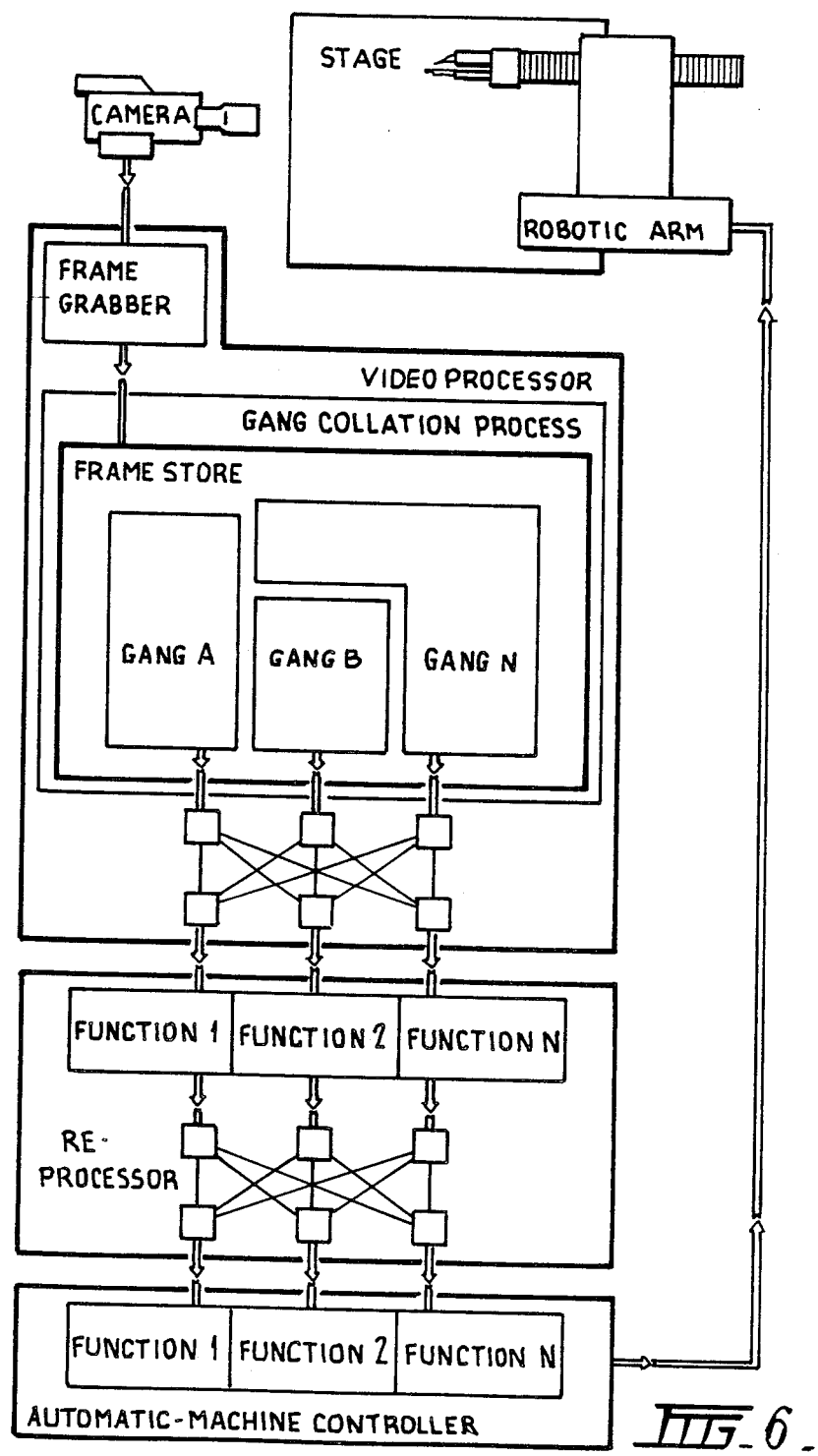
FIG. 6 is a simplified block circuit diagram, similar to that of FIG. 5 but showing the reaction providing means as a robotics arm.

FIG. 6 is a block circuit diagram similar to that of FIG. 5, but showing the reaction providing means as a robotics arm. The block circuit diagram of FIG. 6 is also self explanatory and has particular application for an automatic machine controller. In this implementation the stage is typically the work area for the robotics arm.

Figure 7:
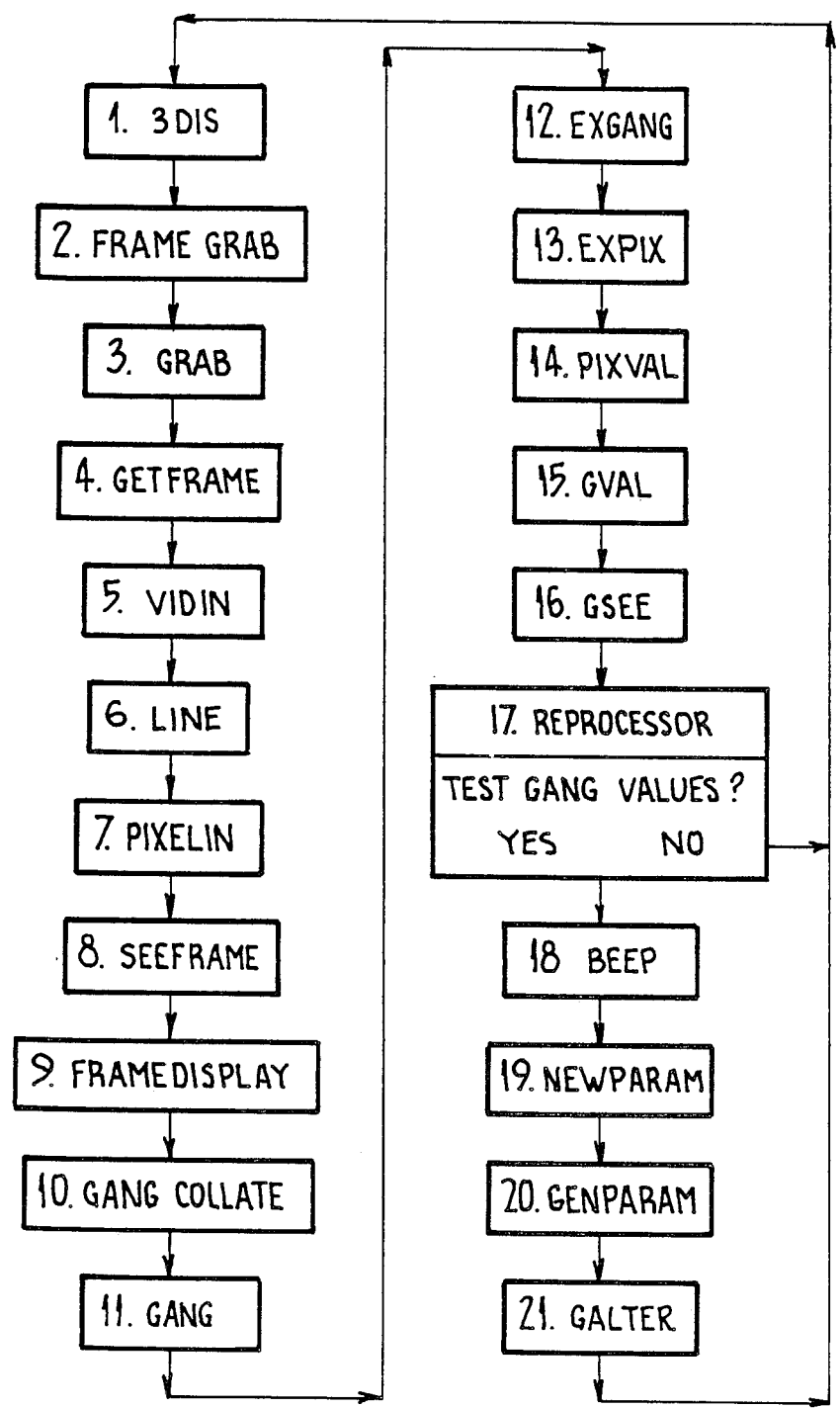
FIG. 7 is a flow chart of programme functions in one implementation of the invention.

Referring now to FIG. 7 there is shown a flow chart of a system implemented on an Apple 2e computer system. In this situation the video camera is replaced by a random number generator to provide individual pixel values to a line, instead of there being a reaction providing means in the true sense. In this embodiment, it comprises an audible output. The various numbered items in FIG. 7 have the following definitions.
1. 3DIS. System control program.
2. FRAME.GRAB. Specifies the frame resolution in XY units and grey levels i.e. X=16, Y=10 and grey=10.
3. GRAB. Passes frame parameters to grabbing mechanisms.
4. GETFRAME. Initializes frame to zero i.e. wipes old frame. Calls the image frame generation process.
5. VIDIN. Loads the frame line by line.
6. LINE. Fills a line of the frame.
7. PIXELIN. Uses a random number generator to provide individual pixel value to LINE.
8. SEEFRAME. Clears and formats screen for subsequent display of acquired frame.
9. FRAMEDISPLAY. Displays frame on screen, line by line.
10. GANG.COLLATE. Control program for ganging process. Loops through the gang parameters and passes them to subsequent procedures. The gang parameters are held in the system as the variable "PARAMS. A gang is specified to the system by referencing its top left XY co-ordinate, the range on the X axis in pixels and the range on the Y axis.
11. GANG. Initializes counters and running totals for the collation process and passes control to gang extraction program.
12. EXGANG. Extracts the specified gang from the frame.
13. EXPIX. Used by EXGANG to access individual pixels within the gang. Makes a copy of the gang as the pixels are processed.
14. PIXVAL. Returns a pixel value to the ganging process.
15. GVAL. Calculates the average value of the pixels contained in the specified gang.
16. GSEE. Formats screen and displays active gang names, parameters and resulting gang values.
17. REPROCESSOR. Provides tests on resultant gang values.
18. BEEP. Provides audible cue if a specific gang value passes a REPROCESSOR applied test. A primitive synthesizer.
19. NEWPARAM. Control program for gang relocation. If a specified gang value tests positive by the REPROCESSOR, NEWPARAM may be applied to relocate the gang within the frame.
20. GENPARAM. A random number generator is used to create the new gang parameter.
21. GALTER. Alters the gang parameter of the selected gang; replacing the old variable with the newly generated one. Operates on the "PARAMS variable.

Two procedures have been included that are not called by the system. They are GEXTR which extracts a specified parameter from the "PARAMS variable and GINCL which inserts a specific parameter into "PARAMS. These procedures may be used by the operator, manually so to speak, to insert and delete parameters in "PARAMS.

It should be noted that all random sequences in this model may be replaced with other suitably derived sequences.

A program listing written in LCSI logo version 1.5 is set out below. The minimum requirement for this embodiment is an Apple 2e computer with one disc drive. The program is inserted via the disc drive and the system is booted. When the logo requests that a user disc be inserted the Return button is operated and the program continues automatically. The embodiment shown in relation to FIG. 7 is a simplified operative version of one implementation of the invention.

```
TO REPROCESSOR
IF :GANG#1      5 [BEEP 1 NEWPARAM 3]
IF :GANG#2      5 [NEWPARAM 2]
IF :GANG#3      8 [NEWPARAM 2]
IF: GANG#4      3 [BEEP 4 NEWPARAM 4]
END
TO GETFRAME
MAKE "FRAME [ ]
VIDIN
END
TO PIXVAL
OP ITEM :XX ITEM :YY :FRAME
END
TO GVAL
OP :GSUM / :GCOUNT
END
TO GANG :XX :YY :XRANGE :YRANGE
MAKE "GSUM 0
MAKE "GCOUNT :XRANGE * :YRANGE
MAKE "GCOPY (LIST :XX :YY :XRANGE :YRANGE)
EXGANG :XX :YY :XRANGE :YRANGE
GSEE
MAKE "GNUM :GNUM + 1
END
TO EXGANG :XX :YY :XRANGE :YRANGE
IF :YRANGE = 0 [STOP]
EXPIX :XX :YY :XRANGE
EXGANG :XX :YY + 1 :XRANGE :YRANGE - 1
END
TO FRAMEDISPLAY :FRAME
IF EMPTYP :FRAME [PR " STOP]
SHOW FIRST :FRAME
FRAMEDISPLAY BF :FRAME
END
TO PIXELIN :DEEP
OP RANDOM :DEEP
END
TO LINE
MAKE "LINE [ ]
REPEAT :X [MAKE "LINE LPUT ( PIXELIN :DEEP ) :LINE]
OP :LINE
END
TO EXPIX :XX :YY :XRANGE
IF :XRANGE = 0 [STOP]
MAKE "PVAL PIXVAL
MAKE "GCOPY LPUT :PVAL :GCOPY
MAKE "GSUM :GSUM + PIXVAL
EXPIX :XX + 1 :YY :XRANGE - 1
END
TO GRAB :X :Y :DEEP
GETFRAME
SEEFRAME
END
TO SEEFRAME
CLEARTEXT
SET CURSOR [0 4]
FRAMEDISPLAY :FRAME
END
TO VIDIN
REPEAT :Y [MAKE "FRAME LPUT LINE :FRAME]
END
TO FRAME.GRAB
GRAB 16 10 10
END
TO GANG.COLLATE :A
MAKE "B THING :A
MAKE "GNUM 1
LABLE "GCLOOP1
IF EMPTYP :B [STOP]
IF EMPTYP FIRST :B [MAKE "GNUM :GNUM + 1 GO "GCLOOP2]
RUN SE "GANG FIRST :B
LABEL "GCLOOP 2
MAKE "B BF :B
GO "GCLOOP1
END
TO GEXTR :A
MAKE "TEMP1 :PARAMS
MAKE "TEMP2 [ ]
MAKE "GEXTR ITEM :A :PARAMS
REPEAT :A − 1 [MAKE "TEMP2 LPUT FIRST :TEMP1 :TEMP2 MAKE "TEMP1 BF :TEMP1]
MAKE :TEMP1 BF :TEMP1
MAKE "PARAMS SE :TEMP2 :TEMP1
END
TO GINCL :A :B
MAKE "TEMP1 :PARAMS
MAKE "TEMP2 [ ]
REPEAT :A − 1 [MAKE "TEMP2 LPUT FIRST :TEMP1 :TEMP2 MAKE "TEMP1 BF :TEMP1]
MAKE "TEMP1 BF :TEMP1
MAKE "PARAMS SE :TEMP2 :TEMP1
END
TO GALTER :A :B
MAKE "TEMP1 :PARAMS
MAKE "TEMP2 [ ]
MAKE "GEXTR ITEM :A :PARAMS
REPEAT :A − 1 [MAKE "TEMP2 LPUT FIRST :TEMP1 :TEMP2 MAKE "TEMP1 BF :TEMP1]
MAKE "TEMP1 BF :TEMP1
MAKE "TEMP1 FPUT :B :TEMP1
MAKE "PARAMS SE :TEMP2 :TEMP1
END
TO GSEE
MAKE "GNAM WORD "GANG# :GNUM
MAKE :GNAM GVAL
TYPE :GNAM
TYPE "
TYPE "[
TYPE FIRST :B
TYPE "]
SET CURSOR LIST 25 LAST CURSOR
PR THING :GNAM
END
TO NEWPARAM :G#
MAKE "NPARAM GENPARAM
GALTER :G# :NPARAM
END
TO GENPARAM
MAKE "NX (RANDOM 16) + 1
MAKE "NY (RANDON 10) + 1
MAKE "NXR (RANDOM (16 − :NX)) + 1
MAKE "NYR (RANDOM (10 − :NY)) + 1
OP (LIST :NX :NY :NXR :NYR)
END
TO BEEP :B#
REPEAT :B# [TYPE CHAR 7]
WAIT 30
END
TO 3DIS
FRAME.GRAB
GANG.COLLATE "PARAMS
REPROCESSOR
3DIS
END
PARAMS IS [[1 1 1 1] [16 3 1 3] [16 1 1 1] [15 8 1 1] [5 5 5 5] [8 2 4 3]]
```

Modifications may be made to the invention as would be apparent to persons skilled in the electronic signal processing arts. These and other modifications may be made without departing from the ambit of the invention the nature of which is to be determined from the foregoing description.

I claim:

1. Apparatus for viewing a target volume and for providing a reaction consequent on a changing image therein comprising,
    (a) two means for viewing the target volume at spaced apart locations and for creating respective two dimensional video picture frame signals of the target volume which collectively define said target volume,
    (b) analyzing means for analyzing the signals relating to at least one discrete area within each respective picture frame, said analyzing means having feeding means for feeding control signals generated therein to a reaction providing means, said control signals being generated during a respective single frame of each respective picture frame, to provide said reaction consequent on there being an image change in the at least one discrete area from an earlier frame.

2. Apparatus as claimed in claim 1, wherein said analyzing means is dynamically alterable so that said discrete area can be changed automatically to a succession of changing patterns over a plurality of successive picture frames consequent on there being a change occurring in the target volume during a picture frame.

3. Apparatus as claimed in claim 2, wherein the analyzing means is programmable so that a number of discrete areas will change, consequent on there being a change in any one of the discrete areas in a picture frame, said change being in accordance with programme instructions.

4. Apparatus as claimed in claim 1, wherein the reaction providing means is a synthesizer and the apparatus is configured for playing music consequent on a changing image in the target volume.

5. A method for providing a reaction based on a changing image in a target volume under view, said method comprising:
    (a) viewing said target volume at two spaced apart locations and creating respective two dimensional video picture frame signals the target volume;
    (b) analyzing the signals relating to at least one discrete area within each picture frame;
    (c) feeding control signals to a reaction providing means to provide a reaction in said reaction providing means consequent on there being an image change analyzed in step (b).

6. A method as claimed in claim 5, comprising dynamically altering the discrete areas automatically if there is a change in the target area during one or more successive picture frames, so that said discrete areas are changed automatically to a succession of changing patterns over a plurality of successive picture frames.

7. A method as claimed in claim 5, further comprising causing said discrete area to concentrate on an area in each picture frame where there is a change occurring from previous picture frames, whereby to provide a more detailed examination of the volume where an image change occurs.

8. A method as claimed in claim 7, further comprising causing a number of the discrete areas to change consequent on there being a change in any one of the discrete areas in a picture frame.

9. A method as claimed in claim 5, further comprising feeding said control signals to a synthesizer.

* * * * *